(12) United States Patent
Wolf et al.

(10) Patent No.: US 7,788,020 B2
(45) Date of Patent: Aug. 31, 2010

(54) SYSTEM AND METHOD FOR DETECTING CYLINDER MISFIRE

(75) Inventors: Adam J. Wolf, Cedar Falls, IA (US); Thomas M. Johnson, Dike, IA (US); Wes Klingaman, Waterloo, IA (US)

(73) Assignee: Deere & Company, Moline, IL (US)

( * ) Notice: Subject to any disclaimer, the term of this patent is extended or adjusted under 35 U.S.C. 154(b) by 242 days.

(21) Appl. No.: 12/046,036

(22) Filed: Mar. 11, 2008

(65) Prior Publication Data

US 2009/0234562 A1 Sep. 17, 2009

(51) Int. Cl.
*G01M 15/11* (2006.01)
*F02D 21/08* (2006.01)
*F02M 25/07* (2006.01)

(52) U.S. Cl. ............... 701/108; 73/114.06; 123/568.11

(58) Field of Classification Search ................. 701/103, 701/108, 111; 73/114.06
See application file for complete search history.

(56) References Cited

U.S. PATENT DOCUMENTS

| | | | |
|---|---|---|---|
| 3,924,457 A | 12/1975 | Oshima et al. ............... 73/116 |
| 4,424,709 A * | 1/1984 | Meier et al. ................. 701/102 |
| 5,109,825 A | 5/1992 | Joos et al. .................... 123/479 |
| 5,193,513 A | 3/1993 | Marko et al. ................ 123/571 |
| 5,214,958 A * | 6/1993 | Inada et al. ............... 73/114.04 |
| 5,369,989 A | 12/1994 | Gates, Jr. et al. ............... 73/115 |
| 5,415,036 A | 5/1995 | Park .......................... 73/117.3 |
| 5,524,480 A * | 6/1996 | Schlienz et al. .......... 73/114.03 |
| 5,719,330 A * | 2/1998 | Carr et al. ................ 73/114.62 |
| 5,848,372 A * | 12/1998 | Ito et al. ..................... 701/111 |
| 6,243,641 B1 | 6/2001 | Andrews et al. ............ 701/102 |
| 6,651,490 B1 | 11/2003 | Ceccarani et al. .......... 73/117.3 |
| 7,263,428 B2 * | 8/2007 | Kobayashi et al. .......... 701/108 |
| 2003/0101974 A1* | 6/2003 | Wienand et al. ....... 123/568.12 |
| 2004/0089061 A1* | 5/2004 | Matsunaga et al. ......... 73/118.1 |
| 2007/0107708 A1* | 5/2007 | Uchiyama et al. ....... 123/568.18 |
| 2009/0234562 A1* | 9/2009 | Wolf et al. .................. 701/108 |

* cited by examiner

*Primary Examiner*—Stephen K Cronin
*Assistant Examiner*—Arnold Castro
(74) *Attorney, Agent, or Firm*—Taylor IP, P.C.

(57) ABSTRACT

A system for detecting individual cylinder misfire in a multiple cylinder internal combustion (IC) engine having exhaust gas recirculation (EGR). The system includes: a device for predicting EGR flow rate on a cylinder to cylinder basis; a device for sensing actual EGR flow rate on a cylinder to cylinder basis with all cylinders firing; and a device for comparing the predicted EGR flow rate to the actual EGR flow to determine individual cylinder misfire.

19 Claims, 2 Drawing Sheets

SYSTEM AND METHOD FOR DETECTING CYLINDER MISFIRE

FIELD OF THE INVENTION

The invention relates to internal combustion engines and more particularly to systems and methods for sensing individual cylinder misfire.

BACKGROUND OF THE INVENTION

In the decades long quest for increasing engine efficiency while at the same time meeting ever more stringent emissions standards, engines have been controlled electronically through the use of electronically controlled injectors to carefully meter and time the introduction of fuel for optimum efficiency and a reduction of exhaust components considered harmful for the environment. Such fuel systems may be a unit injector wherein the injection pressure is developed at the cylinder or in various common rail systems in which the pressure is generated elsewhere.

In both instances, particularly for diesel engines, the fuel timing and quantity is especially important given the varied environmental and operational environment for the engine. The need for precise and flexible control is even more important in the case of diesel engines having exhaust gas recirculation (EGR). Such systems are important to reduce the oxides of nitrogen by reducing the combustion temperatures for the engine. While the oxides of nitrogen are properly reduced there is an increase in the quantity of particulates in the engine exhaust. Such increase requires various aftertreatment devices including particulate filters and in some cases catalysts. The problem with the use of devices of this type is that variations in the composition and flow of the exhaust, including the presence of un-burnt hydrocarbons, can be influenced by individual cylinder misfire. This is when the proper combustion does not occur for a variety of reasons, all of which can cause a variation in the composition of the exhaust flow and therefore the need for adjustment of the engine management strategy to remediate exhaust flow composition.

It is difficult to detect cylinder misfire with the standard fuel system components for controlling the operation of the engine. As a result, additional components, usually in the form of pressure and/or temperature sensors in the exhaust flow are employed to determine the existence of a misfire by fluctuations in pressure and/or temperature. Such systems add additional complexity and cost to the system in addition to providing a further failure mode in that the additional sensors are exposed to the most harmful portion of the exhaust flow.

What is needed therefore, in the art, is a system and method for simplifying and making effective the determination of cylinder misfire.

SUMMARY OF THE INVENTION

In one form the invention is a system for detecting individual cylinder misfire in a multiple cylinder internal combustion (IC) engine having exhaust gas recirculation (EGR), said system including: a device for predicting EGR flow rate on a cylinder to cylinder basis; a device for sensing actual EGR flow rate on a cylinder to cylinder basis with all cylinders firing; and a device for comparing the predicted EGR flow rate to the actual EGR flow to determine individual cylinder misfire.

In another form, the invention is a method of determining individual cylinder misfire in a multiple cylinder internal combustion engine (IC) engine having exhaust gas recirculation (EGR) including the steps of: predicting EGR flow rate on a cylinder to cylinder basis with all cylinders firing; sensing actual EGR flow rate on a cylinder to cylinder basis; and comparing the predicted EGR flow rate to the actual EGR flow rate to determine individual cylinder misfire.

DETAILED DESCRIPTION OF THE INVENTION

Figure 1:
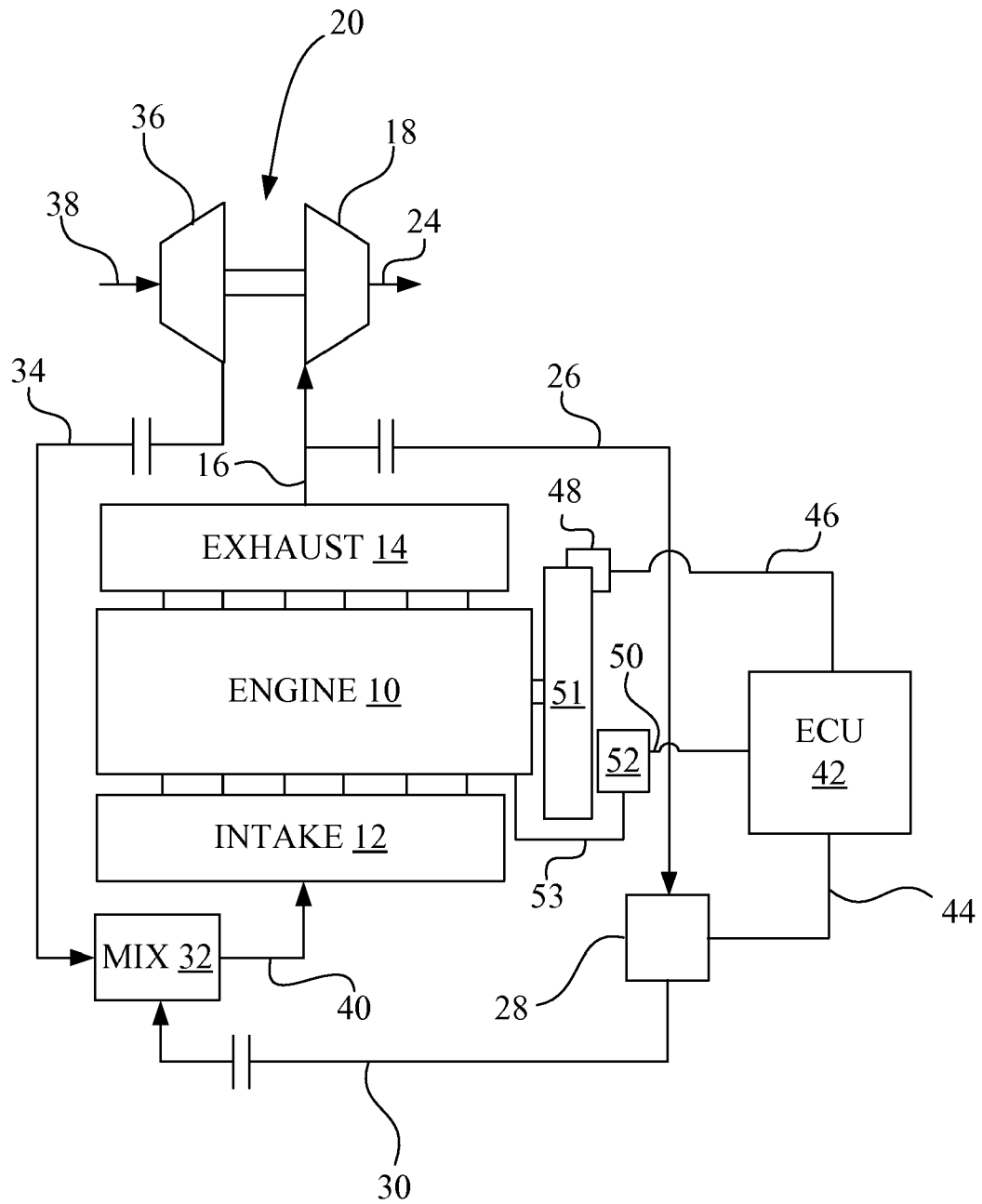
FIG. 1 shows a schematic diagram of an engine system for detecting individual cylinder misfire.

Referring to FIG. 1, there is shown an internal combustion engine system including an engine 10. Engine 10 is a multi-cylinder reciprocating engine in which a plurality of pistons reciprocate within individual cylinders to produce a rotary output at flywheel 51. Engine 10 may be one of a number of types of internal combustion engines but, for illustration purposes, the engine 10 may be a compression ignition or diesel engine in which the heat of compression of air produces a temperature high enough that fuel injected from a fuel system 52 via a delivery means illustrated by line 53 produces combustion to cause the cylinders to fire and drive the piston to produce rotation of flywheel 51 with a torque output.

The products of combustion are delivered to an exhaust manifold 14 which leads to a conduit 16 extending to a turbine 18 of a turbocharger 20. From there, the gases that have passed over the turbine 18 are delivered to an outlet conduit 24. A conduit 26 branches off the exhaust conduit 16 and extends to a mass flow sensor 28. Mass flow sensor 28 connects to a conduit 30 leading to a mixer 32 that mixes exhaust gas into air flowing into a conduit 40 leading to the intake manifold 12. Exhaust gas recirculation (EGR) has been used extensively to reduce oxides of nitrogen in engine exhaust. The mixer 32 receives a supply of fresh air from conduit 34 leading to a compressor 36 incorporated in the turbocharger 20 and driven by turbine 18. Compressor 36 receives filtered inlet air from a conduit 38. The mixer 32 may also have a control mechanism to determine when EGR should take place.

Mass flow sensor 28 is a differential pressure device for measuring flow through the EGR line and may take one of a number of forms. In general terms, the flow sensor presents an obstruction to flow through the EGR line and the pressure drop across the obstruction reflects the mass flow rate. In one form, the mass flow sensor 28 may be a venturi. This form of a mass flow sensor has been used since Roman times to measure flow using variations in pressure between an upstream location and a throat of the venturi unit. It uses the Bernoulli principle which incorporates pressure differential and other variables to compute mass flow. In another form the mass flow sensor may be a simple orifice in which the pressure differential is measured between a point upstream of the orifice and at the "vena contracts", just downstream of the orifice to determine mass flow. This device also uses the Bernoulli principle. Still other forms of pressure differential flow sensors using the Bernoulli principle may be a nozzle, segmental wedge, V-cone, Dall tube, and others.

The engine 10 is controlled by an ECU 42 that receives crankshaft position signals via line 46 from a crankshaft position sensor 48 positioned adjacent flywheel 51. The ECU 42 has a signal line 44 extending to mass flow sensor 28 that measures pressure differential across the mass flow sensor 28 through the use of appropriate pressure sensors (not shown in detail) and therefore the mass flow rate of the EGR.

The capability of the pressure sensors to determine pressure differential is advanced to the point where the pressure differential across mass flow sensor 28 is sub-cyclic in response time. That is, the pressure sensors respond to changes in less than a full engine cycle. The crankshaft position sensor 48 provides a signal to ECU 42 that correlates the pressure signals at the mass flow sensor 28 to individual engine cylinder activity.

Figure 2:
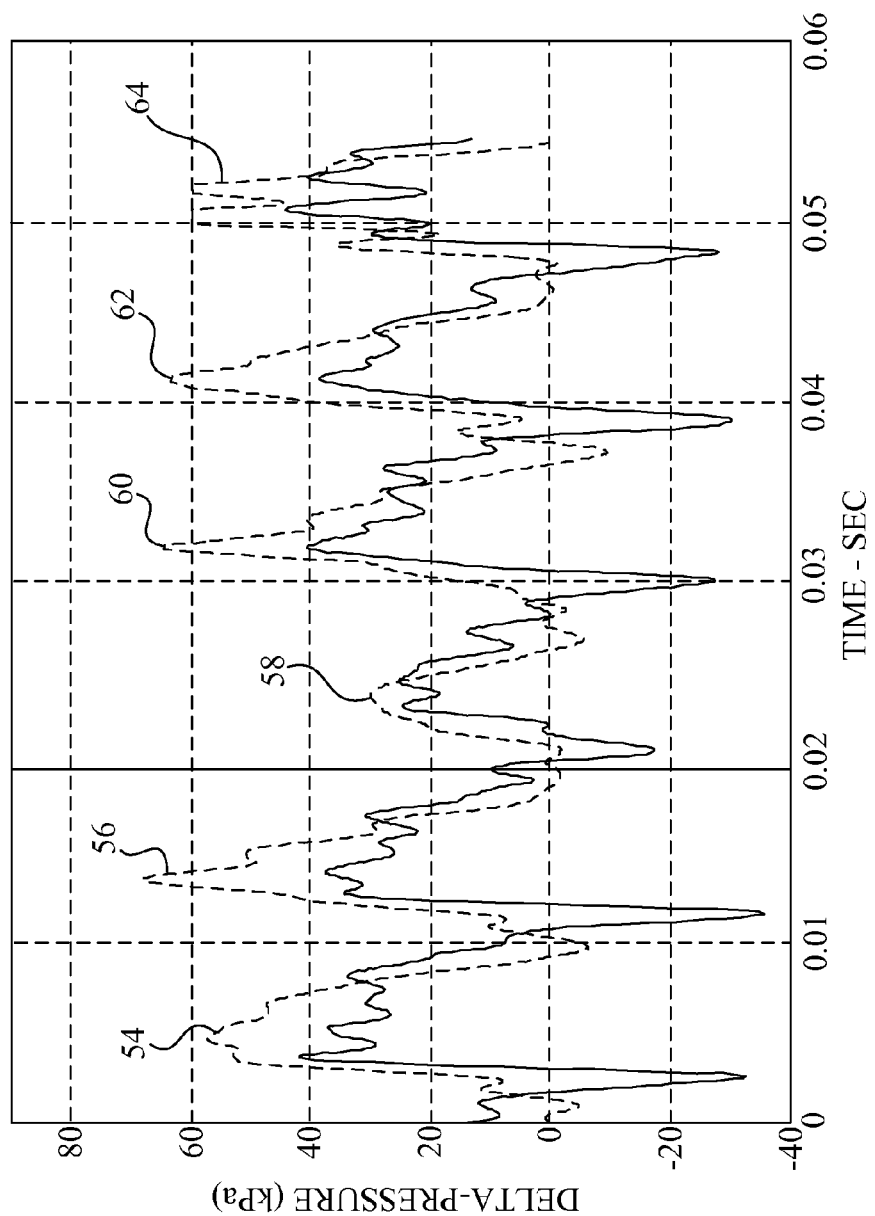
FIG. 2 shows the cyclic variation in exhaust gas recirculation (EGR) flow for the system of FIG. 1.

This rapid response is employed to provide an indication of cylinder misfire. The flow through the EGR line 26 is pulsating in nature due to the cylinder firing intervals of engine 10. When the cylinders are all firing, the differential pressure in the mass flow sensor 28 has peaks and valleys as indicated in FIG. 2 showing differential pressure versus time in seconds. When all cylinders are firing, the differential pressure produces a regular periodic wave having peaks 54, 56, 60, 62 and 64. These pulses are not as great as the pressure pulses experienced directly in the exhaust pipe 16 but they are discrete enough to detect variations in pressure, and therefore variations in EGR mass flow caused by a cylinder misfire. Such a misfire is shown in FIG. 2 as the absence of a peak 58, in this case for cylinder 3 of a six cylinder engine. The absence of a normal peak as exhibited by 58 is fed to the ECU 42.

ECU 42 stores recent history of EGR flow to produce a predicted EGR flow on a cylinder to cylinder basis. The real-time pressure sensor signals from the mass flow sensor 28 are compared to the predicted signals to determine whether a misfire has occurred. Once the ECU determines that a misfire has occurred, it provides a control function via line 50 to a fuel control system 52 to adjust the engine management strategy as needed to correct the misfire. Such a corrective action is important to insure that any exhaust aftertreatment does not suffer by undetected hydrocarbons entering the exhaust conduit of the engine 10.

The above feature is provided without adding any new and expensive hardware in the engine exhaust line 16 or exhaust manifold which would add additional cost, complexity and the potential for reduced reliability.

Having described the preferred embodiment, it will become apparent that various modifications can be made without departing from the scope of the invention as defined in the accompanying claims.

The invention claimed is:

1. A system for detecting individual cylinder misfire in a multiple cylinder internal combustion (IC) engine having an exhaust gas recirculation (EGR) system, said misfire detection system comprising:
   a device for predicting EGR flow rate on a cylinder to cylinder basis;
   a device for sensing actual EGR flow rate on a cylinder to cylinder basis with all cylinders firing; and
   a device for comparing the predicted EGR flow rate to the actual EGR flow to determine individual cylinder misfire.

2. The system as claimed in claim 1, wherein said engine includes a fuel system and an engine electronic control module (ECU) and said system further comprises a combustion management strategy within said ECU to correct misfire.

3. The system as claimed in claim 2, wherein said combustion management strategy is one of at least adjusting fuel rate and quantity and combustion timing.

4. The system as claimed in claim 1, wherein said EGR flow rate is detected by a device sensing differential pressure across an obstruction.

5. The system as claimed in claim 4 wherein said device is one of a venturi, orifice, nozzle, segmental wedge, V-cone and Dall tube.

6. The system as claimed in claim 5 wherein said device is a venturi.

7. The system as claimed in claim 5 wherein said device is an orifice.

8. The system as claimed in claim 2, wherein said engine has a crank angle sensor to correlate the crank angle to activity in individual cylinders.

9. The system as claimed in claim 8, wherein said device for comparing predicted and actual EGR flow stores a history of EGR flow to predict current EGR flow.

10. The system as claimed in claim 9, wherein said corrected action is one of adjusting fueling rate and/or quantity and combustion timing.

11. A method of determining individual cylinder misfiring in a multiple cylinder internal combustion engine (IC) engine having an exhaust gas recirculation (EGR) system comprising the steps of:
    predicting EGR flow rate on a cylinder to cylinder basis with all cylinders firing;
    sensing actual EGR flow rate on a cylinder to cylinder basis; and
    comparing the predicted EGR flow rate to the actual EGR flow rate to determine individual cylinder misfiring.

12. The method as claimed in claim 11, wherein said internal combustion engine has a fuel system and electronic control unit (ECU) and wherein said method comprises the further step of correcting misfire determined by said system.

13. The method as claimed in claim 12, wherein said corrected step is one of adjusting fueling rate and/or quantity and combustion timing.

14. The method as claimed in claim 11, wherein said EGR flow rate is detected by a device sensing differential pressure across an obstruction.

15. The method as claimed in claim 14 wherein said device is one of a venturi, orifice, nozzle, segmental wedge, V-cone and Dall tube.

16. The method as claimed in claim 15 wherein said device is a venturi.

17. The method as claimed in claim 15 wherein said device is an orifice.

18. The method as claimed in claim 11, comprising the further step of correlating the crank angle of the engine to individual cylinder conditions.

19. The method as claimed in claim 18, comprising the further step of storing the history of EGR flow and comparing actual EGR flow to correct predicted EGR flow.

* * * * *